United States Patent
Pang et al.

(10) Patent No.: US 10,851,238 B2
(45) Date of Patent: Dec. 1, 2020

(54) POLYMERIC COMPOSITION, METHOD FOR PRODUCING POLYMERIC COMPOSITION, ELECTRONIC APPARATUS, AND METHOD FOR MANUFACTURING ELECTRONIC APPARATUS

(71) Applicant: SAMSUNG ELECTRONICS CO., LTD., Suwon-si (KR)

(72) Inventors: Kyeong Pang, Suwon-si (KR); Pil Gu Kwon, Suwon-si (KR); In Kim, Suwon-si (KR); Hye Jeong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 123 days.

(21) Appl. No.: 15/765,347

(22) PCT Filed: Aug. 19, 2016

(86) PCT No.: PCT/KR2016/009173
§ 371 (c)(1),
(2) Date: Apr. 2, 2018

(87) PCT Pub. No.: WO2017/057847
PCT Pub. Date: Apr. 6, 2017

(65) Prior Publication Data
US 2018/0282536 A1 Oct. 4, 2018

(30) Foreign Application Priority Data

Oct. 2, 2015 (KR) ........................ 10-2015-0138950

(51) Int. Cl.
| | | |
|---|---|---|
| *C08L 55/02* | (2006.01) | |
| *C08L 69/00* | (2006.01) | |
| *C08L 61/04* | (2006.01) | |
| *C08K 5/17* | (2006.01) | |
| *C08K 5/529* | (2006.01) | |
| *C08K 5/49* | (2006.01) | |
| *C08G 67/02* | (2006.01) | |
| *C08L 25/12* | (2006.01) | |
| *B29C 48/92* | (2019.01) | |
| *B29C 48/80* | (2019.01) | |
| *B29C 48/00* | (2019.01) | |

(52) U.S. Cl.
CPC .......... *C08L 55/02* (2013.01); *B29C 48/832* (2019.02); *B29C 48/92* (2019.02); *C08G 67/02* (2013.01); *C08K 5/17* (2013.01); *C08K 5/49* (2013.01); *C08K 5/529* (2013.01); *C08L 25/12* (2013.01); *C08L 61/04* (2013.01); *C08L 69/00* (2013.01); *B29C 48/022* (2019.02); *B29C 2948/92704* (2019.02); *B29C 2948/92895* (2019.02); *C08L 2203/20* (2013.01)

(58) Field of Classification Search
CPC .......... C08L 55/02; C08L 69/00; C08L 61/04; C08L 2203/20; C08K 5/17; C08K 5/529
See application file for complete search history.

(56) References Cited

U.S. PATENT DOCUMENTS

| | | | |
|---|---|---|---|
| 4,880,908 A | | 11/1989 | Lutz et al. |
| 5,086,113 A | * | 2/1992 | Kamins .................. C08L 55/02 525/190 |
| H1601 H | | 10/1996 | Machado et al. |

FOREIGN PATENT DOCUMENTS

| | | |
|---|---|---|
| CN | 1472251 A | 2/2004 |
| EP | 0451918 | 10/1991 |
| EP | 0 940 441 A1 | 9/1999 |
| EP | 0940441 A1 * | 9/1999 .......... C08L 2666/24 |
| EP | 2 128 200 A1 | 12/2009 |
| JP | 10-1601 | 1/1998 |
| KR | 10-2011-0012153 | 2/2011 |
| KR | 10-2012-0077807 | 7/2012 |
| KR | 10-2013-0021283 | 3/2013 |
| WO | 98-54262 | 12/1998 |
| WO | 99-54406 | 10/1999 |

OTHER PUBLICATIONS

European Communication dated Mar. 14, 2019 in European Patent Applicaiton No. 16851995.7.
Partial Supplementary European Search Report dated Jun. 27, 2018 in corresponding European Patent Application No. 16851995.7, 13 pgs.
Written Opinion of the International Searching Authority dated Dec. 7, 2016 in International Patent Application No. PCT/KR2016/009173.
International Search Report dated Dec. 7, 2016 in International Patent Application No. PCT/KR2016/009173.
Extended European Search Report dated Oct. 2, 2018 in European Patent Application No. 16851995.7.
Indian Office Action dated Jul. 2, 2020 in corresponding Indian Patent Application No. 201817016400.

* cited by examiner

*Primary Examiner* — Robert D Harlan
(74) *Attorney, Agent, or Firm* — Staas & Halsey LLP

(57) ABSTRACT

One aspect is directed to providing a polymeric composition containing a polyketone, which is an eco-friendly material, a method for preparing the same, an electronic apparatus, and a method for preparing the same. The polymeric composition according to one aspect includes 3 to 20 parts by weight of a polyketone resin prepared with carbon monoxide as a raw material and 80 to 97 parts by weight of a thermoplastic resin including an acrylonitrile-butadiene-styrene (ABS) copolymer resin with respect to the total weight of the polymeric composition.

14 Claims, 6 Drawing Sheets

POLYMERIC COMPOSITION, METHOD FOR PRODUCING POLYMERIC COMPOSITION, ELECTRONIC APPARATUS, AND METHOD FOR MANUFACTURING ELECTRONIC APPARATUS

CROSS-REFERENCE TO RELATED APPLICATIONS

This application is a U.S. National Stage Application which claims the benefit under 35 U.S.C. § 371 of International Patent Application No. PCT/KR2016/009173, filed on Aug. 19, 2016, which claims the priority benefit of Korean Patent Application No. 10-2015-0138950, filed on Oct. 2, 2015 in the Korean Patent and Trademark Office, the disclosures of which are hereby incorporated by reference in their entirety.

TECHNICAL FIELD

The present invention relates to a polymeric composition containing polyketone, a method for producing the same, an electronic apparatus, and a method for manufacturing the same.

BACKGROUND ART

As development of the telecommunication industry, display devices and portable wireless terminals have become smaller, thinner and lighter, and have a higher image quality, and thus their functions have become more diverse.

For this reason, it is necessary to develop a material which maintains the stiffness of a product while the product becomes thinner, has a rheological characteristic that does not have a problem in product moldability during a process, and also has eco-friendliness that meets consumers' needs.

Therefore, in recent years, there has been growing interest in proactive carbon reduction technology that captures harmful gases and greenhouse gases and converts them into carbon products of high value.

DISCLOSURE

Technical Problem

One aspect of the present invention is directed to providing a polymeric composition containing polyketone, which is an eco-friendly material, a method for producing the same, an electronic apparatus and a method for manufacturing the electronic apparatus.

Another aspect of the present invention is directed to providing a polymeric composition further including an acrylonitrile-butadiene-styrene (ABS) copolymer resin to compensate for the physical property of polyketone, which is an eco-friendly material, a method for producing the same, an electronic apparatus and a method for manufacturing the electronic apparatus.

Technical Solution

A polymeric composition according to an aspect includes 3 to 20 parts by weight of a polyketone resin prepared with carbon monoxide (CO) as a raw material; and 80 to 97 parts by weight of a thermoplastic resin containing an acrylonitrile-butadiene-styrene (ABS) copolymer resin, with respect to the total weight of the polymeric composition.

In addition, the acrylonitrile-butadiene-styrene (ABS) copolymer resin may include 15 to 22 parts by weight of the acrylonitrile component with respect to the total weight of the acrylonitrile-butadiene-styrene (ABS) copolymer resin.

The thermoplastic resin may further include a polycarbonate resin.

In addition, 1 part by weight or more and less than 100 parts by weight of the acrylonitrile-butadiene-styrene (ABS) copolymer resin may be included with respect to the total weight of the polycarbonate (PC) resin.

In addition, 10 to 20 parts by weight of a reinforcement may be further included with respect to the total weight of the polymeric composition.

In addition, 1 to 3 parts by weight of an amine-based compatibilizer may be further included with respect to the total weight of the polymeric composition.

Moreover, a phosphorous-base flame retardant may be further included.

A polymeric composition according to one aspect includes 3 to 20 parts by weight of a polyketone resin prepared with carbon monoxide (CO) as a raw material; and 80 to 97 parts by weight of a thermoplastic resin containing a polycarbonate (PC) with respect to the total weight of the polymeric composition.

In addition, the thermoplastic resin may further include an acrylonitrile-butadiene-styrene (ABS) copolymer resin.

In addition, the acrylonitrile-butadiene-styrene (ABS) copolymer resin may include 15 to 22 parts by weight of the acrylonitrile component with respect to the total weight of the acrylonitrile-butadiene-styrene (ABS) copolymer resin.

In addition, the thermoplastic resin may include 1 part by weight or more and less than 100 parts by weight of an acrylonitrile-butadiene-styrene (ABS) copolymer resin with respect to the total weight of the polycarbonate (PC) resin.

In addition, 10 to 20 parts by weight of a reinforcement may be further included with respect to the total weight of the polymeric composition.

In addition, 1 to 3 parts by weight of an amine-based compatibilizer may be further included with respect to the total weight of the polymeric composition.

In addition, a phosphorous-based flame retardant may be further included.

Next, a polymeric composition according to one aspect includes a polyketone resin prepared with carbon monoxide (CO) as a raw material; an acrylonitrile-butadiene-styrene (ABS) resin; and an amine-based compatibilizer.

Next, an electronic apparatus according to one aspect consists of a polymeric composition including 3 to 20 parts by weight of a polyketone resin prepared with carbon monoxide (CO) as a raw material and 80 to 97 parts by weight of an acrylonitrile-butadiene-styrene (ABS) copolymer resin with respect to the total weight of the polymeric composition.

In addition, the acrylonitrile-butadiene-styrene (ABS) copolymer resin may include 15 to 22 parts by weight of the acrylonitrile component with respect to the total weight of the acrylonitrile-butadiene-styrene (ABS) copolymer resin.

In addition, the electronic apparatus may include at least one of interior and exterior materials thereof.

In addition, the electronic apparatus may include at least one selected from the group consisting of a display device, a smart device, a computer, a tablet PC, a printer, a multi-function printer, a refrigerator, a washing machine, an air conditioner, a robot cleaner, a camera, an e-book, an e-paper, 3D glasses and a battery charger.

A method for preparing a polymeric composition according to one aspect includes: mixing a polymeric composition comprising 3 to 20 parts by weight of a polyketone resin prepared with carbon monoxide (CO) as a raw material and 80 to 97 parts by weight of an acrylonitrile-butadiene-styrene (ABS) copolymer resin with respect to the total weight of the polymeric composition; and adding the polymeric composition to a hopper of an extruder.

In addition, adding a flame retardant to a first side feeder may be further included.

In addition, adding a reinforcement to a second side feeder may be further included.

Next, a method for manufacturing an electronic apparatus according to one aspect includes: preparing a polymeric composition comprising 3 to 20 parts by weight of a polyketone resin prepared with carbon monoxide (CO) as a raw material and 80 to 97 parts by weight of an acrylonitrile-butadiene-styrene (ABS) copolymer resin with respect to the total weight of the polymeric composition; and performing injection molding by adding the polymeric composition to an injection molding machine.

In addition, the performing injection molding of the polymeric composition may include adding the polymeric composition to the hopper of the injection molding machine, melting the added polymeric composition, and providing the melted polymeric composition to a mold.

Advantageous Effects

A polymeric composition, a method for producing the polymeric composition, an electronic apparatus molded of the polymeric composition and a method for manufacturing the electronic apparatus according to an aspect use polyketone, which is an eco-friendly material, as a raw material, and can accord with global eco-friendly policies and meet consumers' needs by realizing an eco-friendly raw material. More specifically, the present invention has significance in that, for the first time, a polyketone material is applied to interior or exterior materials of an electronic apparatus.

A polymeric composition, a method for producing the polymeric composition, an electronic apparatus molded of the polymeric composition and a method for manufacturing the electronic apparatus according to another aspect can be provided by mixing polyketone with a different material. Therefore, a high stiffness and a high fluidic characteristic, which are required for thin film molding of interior/exterior materials of an electronic apparatus, can be implemented and ensured, and thus surface hardness, anti-scratch, chemical resistance, and flame retardance of a part injection product can be improved.

MODES OF THE INVENTION

Figure 1A:
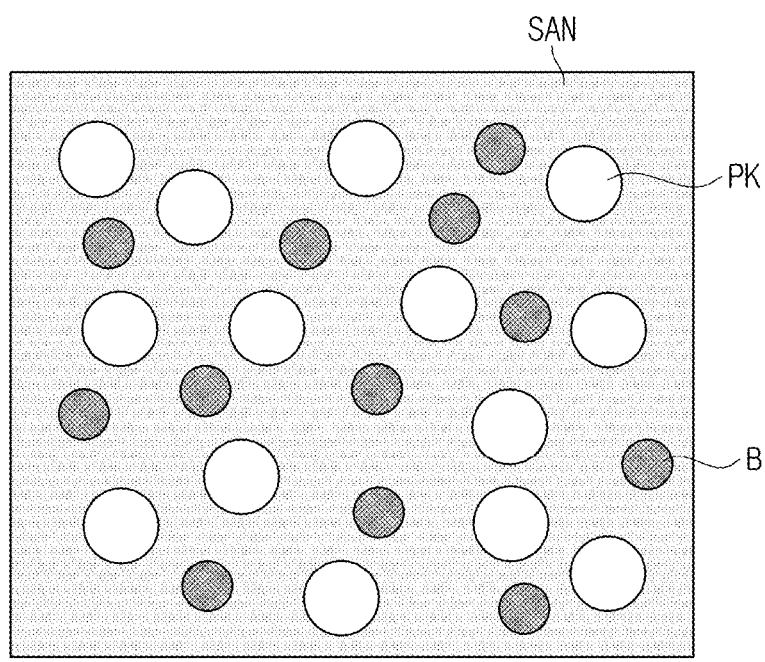
FIGS. 1A and 1B are diagrams illustrating formation of polyketone domains.

The embodiments described in the specification and the configurations shown in the drawings are merely exemplary examples of the present invention, and various modifications may be made to replace the embodiments and drawings of the specification at the time of filing.

Hereinafter, exemplary embodiments of the present invention will be described in detail with reference to the contents shown in the accompanying drawings.

A polymeric composition according to one aspect includes a polyketone resin prepared with carbon monoxide (CO) as a raw material and a thermoplastic resin based on the total weight of the polymeric composition. Specifically, the polymeric composition may include 3 to 20 parts by weight of the polyketone resin prepared with carbon monoxide (CO) as a raw material and 80 to 97 parts by weight of the thermoplastic resin with respect to the total weight of the polymeric composition.

Polyketone is an alternating copolymer of carbon monoxide (CO) and an olefin. Here, an olefin is an aliphatic unsaturated hydrocarbon, and a generic term for a compound containing a double bond between carbon atoms.

Polyketones have crystallinity due to a carbonyl group (C=O) introduced in each of three carbon chains, and are eco-friendly materials because they are made of carbon monoxide (CO), which is an air contaminant as a raw material.

Polyketones are engineering plastics in which the main chain consists of only carbon, have a compact crystal structure with high crystallinity, and therefore, because of such a crystal structure, they are excellent in impact resistance, chemical resistance, wear resistance, fuel resistance, a gas barrier property, and flame retardance.

Specifically, polyketones have an impact strength of approximately 200% or more with respect to nylon, which is a common engineering plastic material. In addition, the polyketones have few changes in physical properties due to moisture. In addition, polyketones have excellent resistance to chemicals. Further, polyketones have wear resistance (based on a base resin) approximately 14 times or higher than polyacetal (POM) which is generally known as a rigid material, and thus can be used as a semi-permanent material. Furthermore, when polyketones combust, water is generated due to the reaction between a carbonyl group (C=O) and hydrogen, thereby forming a char, and as the formed char layer blocks oxygen and heat, flame retardance may be imparted to a molded product manufactured from polyketone as a raw material.

Such polyketone may be prepared by synthesizing carbon monoxide (CO) and an olefin. Specifically, the polyketone may include a copolymer prepared by synthesizing carbon monoxide (CO) and ethylene, and a terpolymer prepared by synthesizing carbon monoxide (CO), ethylene and propylene. Reaction Schemes 1 and 2 below represent the processes of synthesizing the polyketone.

[Reaction Scheme 1]

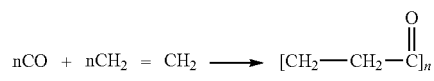

[Reaction Scheme 2]

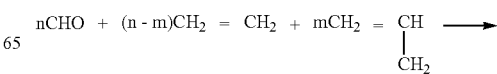

-continued $$-\!\!\left[\!CH_2\!-\!CH_2\!-\!\underset{\underset{O}{\|}}{C}\!\right]_{\!n\text{-}m}\!\!\left[\!CH_2\!-\!CH\!-\!\underset{\underset{O}{\|}}{C}\!\right]_{\!m}\!\!-$$

As shown in [Reaction Scheme 1], a polyketone copolymer may be prepared by synthesizing carbon monoxide (CO) and ethylene, and as shown in [Reaction Scheme 2], a polyketone terpolymer may be prepared by synthesizing carbon monoxide (CO), ethylene and propylene.

The copolymer may be used for a high strength fiber, and generally has a melting point of approximately 260° C., and a molecular weight of approximately 200,000 or more. The terpolymer may be used as a material for engineering plastic and processed by extraction or injection, and may generally have a melting point of approximately 220° C. and a molecular weight of approximately 60,000 or more. Therefore, in Reaction Scheme 1, the integer n may be one in a range that allows the molecular weight of the copolymer to be 200,000 or more, and in Reaction Scheme 2, the integers n and m may be those in a range that allows the molecular weight of the terpolymer to be 600,000 or more.

A thermoplastic resin is a resin that can be heated and modified in shape after being molded by heating, and the thermoplastic resin according to an exemplary embodiment may include at least one of a rubber-modified styrene-based resin and a polycarbonate (PC) resin.

The rubber-modified styrene-based resin may include at least one of acrylonitrile-butadiene-styrene (ABS, hereinafter, may be referred to as an ABS resin), a high impact polystyrene (HIPS) resin, an acrylonitrile styrene acrylic ester copolymer (AAS) resin, and an acrylonitrile-ethylene/propylene rubber-styrene copolymer (AES) resin.

The acrylonitrile-butadiene-styrene (ABS) copolymer resin is a thermoplastic resin consisting of three components such as acrylonitrile, butadiene and styrene, and has excellent dimension stability and molding processability due to a balance of impact resistance, stiffness and flowability. The polyketone resin is a single material and may have shrinkage or bending when being applied to a part of an electronic apparatus. Therefore, the polymeric composition according to the present invention can prevent the shrinkage or bending of the material in molding by mixing the acrylonitrile-butadiene-styrene (ABS) copolymer resin with the polyketone resin.

The high impact polystyrene resin is an opaque resin having a rubber content of approximately 5 to 16%, and may be provided to improve the impact resistance of the material due to a high impact strength. Moreover, the high impact polystyrene resin has excellent molding characteristics such as thermal resistance and flowability. Here, the polymeric composition according to the present invention may prevent shrinkage or bending of the material in molding by mixing the high impact polystyrene resin with the polyketone resin.

Hereinafter, embodiments of the present invention will be described with reference to the acrylonitrile-butadiene-styrene (ABS) copolymer resin among rubber-modified styrene-based resins for the convenience of description.

The polycarbonate (PC) resin is a commercialized thermoplastic resin, and may be synthesized using bisphenol-A as a raw material. The polycarbonate (PC) resin may have excellent mechanical properties, and give impact resistance to a molded product that is formed using the polymeric composition as a material. In addition, the polycarbonate (PC) resin has a self-extinguishing property, and may impart heat resistance and flame retardance to a molded product formed using the polymeric composition according to the present invention.

The polycarbonate (PC) resin has excellent transparency, flexibility and processability as well as the above-described impact resistance, thermal resistance and flame retardance, and thus may be applied in a wide range of applications including automobile parts, packaging materials, and electronic apparatuses.

Such thermoplastic resins may be used alone or in combination therewith. According to an example, when the thermoplastic resins are used in combination thereof, a rubber-modified styrene-based resin and the polycarbonate (PC) resin may be mixed at predetermined ratios. More particularly, the acrylonitrile-butadiene-styrene (ABS) copolymer resin may be provided at 1 part by weight or more and less than 100 parts by weight with respect to total weight of the polycarbonate (PC) resin. A type of the thermoplastic resin included in the polymeric composition may be controlled in a suitable ratio according to the characteristics of a material to be implemented, and descriptions overlapping with the above description will be omitted.

Further, a polymeric composition according to another aspect will be described.

The polymeric composition according to another aspect may include a polyketone resin produced using carbon monoxide (CO) as a raw material, a thermoplastic resin and a compatibilizer with respect to the total weight of the polymeric composition. Specifically, the polymeric composition may include 3 to 20 parts by weight of a polyketone resin produced using carbon monoxide (CO) as a raw material, 80 to 97 parts by weight of a thermoplastic resin, and 1 to 3 parts by weight of a compatibilizer with respect to the total weight of the polymeric composition.

The thermoplastic resin may include at least one of a rubber-modified styrene-based resin including an acrylonitrile-butadiene-styrene (ABS) copolymer resin and a polycarbonate (PC) resin, and descriptions overlapping with the above description will be omitted.

The polymeric composition may further include a compatibilizer to increase compatibility of an alloy of the polyketone resin and the acrylonitrile-butadiene-styrene (ABS) copolymer resin. The compatibilizer is a polymer additive that provides reliability to a material by controlling a phase structure by blending a heteropolymer.

Generally, the polyketone resin and the acrylonitrile-butadiene-styrene (ABS) copolymer resin are non-compatible, and thus polyketone forms a domain in a styrene acrylonitrile (SAN) copolymer resin, which is the matrix part of the acrylonitrile-butadiene-styrene (ABS) copolymer resin. Therefore, the compatibility between the polyketone resin and the acrylonitrile-butadiene-styrene (ABS) copolymer resin may be improved by adding the compatibilizer to the polymeric composition including the polyketone resin and the acrylonitrile-butadiene-styrene (ABS) copolymer resin.

Figure 1B:
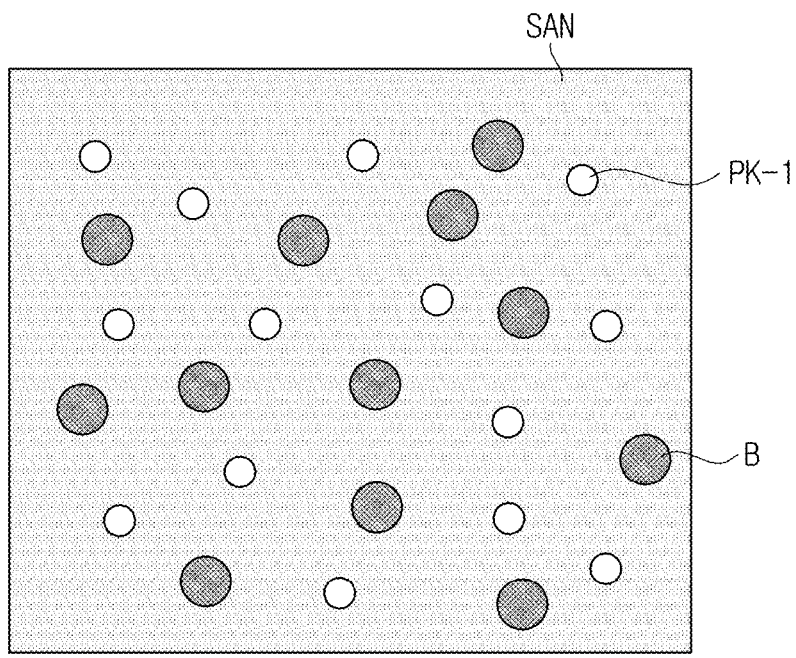

Hereinafter, an example formation of polyketone domains according to the addition of the compatibilizer will be described with reference to the accompanying drawings. FIGS. 1A and 1B illustrate polyketone domains (PK) formed in an acrylonitrile-butadiene-styrene (ABS) copolymer resin. More specifically, FIG. 1A is the diagram that shows an example of polymer alloy formed when an acrylonitrile-butadiene-styrene (ABS) copolymer resin is mixed with a polyketone resin, and FIG. 1B is the diagram that shows an example of polymer alloy formed when a compatibilizer was added to an acrylonitrile-butadiene-styrene (ABS) copolymer resin and a polyketone resin.

Referring to FIG. 1A, the polyketone may form a domain with butadiene (B) in a styrene-acrylonitrile (SAN) copolymer resin, which is the matrix part of the acrylonitrile-butadiene-styrene (ABS) copolymer resin. Generally, the polyketone resin and the acrylonitrile-butadiene-styrene (ABS) copolymer resin have a high surface tension, and therefore, when the polyketone resin is mixed with the acrylonitrile-butadiene-styrene (ABS) copolymer resin, the polyketone domains (PK) are formed in the acrylonitrile-butadiene-styrene (ABS) copolymer resin. Here, when the sizes of the polyketone domains (PK) distributed in the acrylonitrile-butadiene-styrene (ABS) copolymer resin are beyond a certain standard, it may be difficult to achieve the mechanical property of the material. The polymeric composition according to the present invention may improve the compatibility between the materials by adding a compatibilizer into the polymeric composition.

Referring to FIG. 1B, polyketone (PK-1) may form a domain with butadiene (B) in a styrene-acrylonitrile copolymer resin (SAN), which is the matrix part of an acrylonitrile-butadiene-styrene (ABS) copolymer resin.

It can be confirmed that the polymeric composition shown in FIG. 1B in which a compatibilizer is added to the mixture of a polyketone resin and an acrylonitrile-butadiene-styrene (ABS) copolymer resin, compared to that shown in FIG. 1A, which does not include a compatibilizer, has a smaller size of the polyketone domains (PK-1) distributed in the styrene-acrylonitrile copolymer resin (SAN).

When a compatibilizer is added to a non-compatible polymeric composition, a surface tension between the polyketone resin and the styrene-acrylonitrile resin was degraded due to the compatibilizer, thereby improving a binding strength between the interfaces, and therefore, the polyketone domains (PK-1) may be formed in a smaller size.

The polymeric composition according to the present invention may achieve an excellent mechanical property by addition of at least one compatibilizer when an alloy of the polyketone resin and the acrylonitrile-butadiene-styrene (ABS) copolymer resin is prepared.

The compatibilizer may include an amine-based compatibilizer. The amine-based compatibilizer is a copolymer having an amine group at the end, in which the main chain may have affinity to the styrene-acrylonitrile copolymer resin, and the amine group at the end may allow the compatibility between the materials to be improved by reacting with a ketone group of the polyketone.

The amine-based compatibilizer may include one amine group at the end. Specific examples of amine-based compatibilizers are N-(2-aminoethyl)-3-aminopropyltrimethoxysilane, (3-aminopropyl)trimethoxysilane, and (3-aminopropyl)triethoxysilane. However, the present invention is not limited to the above examples of the amine-based compatibilizers, and may include modifications within a range that can be easily inferred by those of ordinary skill in the art.

Meanwhile, when the amine-based compatibilizer includes two or more amine groups at the end, crosslinking occurs with the ketone group of the polyketone, and thus the composition may be gelated, thereby degrading processability. For this reason, it is preferable to use a compatibilizer having one amine group at the end.

Such an amine-based compatibilizer may be used alone, and can also be used in combination with at least one of a core-shell rubber type compatibilizer, a maleic anhydride-modified copolymer compatibilizer and a glycidyl-modified copolymer compatibilizer to reinforce impact strength.

According to an embodiment, the polymeric composition of the present invention may increase the compatibility between the acrylonitrile-butadiene-styrene (ABS) copolymer resin and the polyketone resin by increasing an acrylonitrile content in the acrylonitrile-butadiene-styrene (ABS) copolymer resin. The acrylonitrile-butadiene-styrene (ABS) copolymer may be prepared by blending a styrene-acrylonitrile copolymer resin and a butadiene-grafted styrene-acrylonitrile copolymer resin (hereinafter, referred to as a butadiene-g-ABS resin), and the acrylonitrile component of the styrene-acrylonitrile copolymer resin may serve as a compatibilizer.

According to an embodiment, the acrylonitrile-butadiene-styrene (ABS) copolymer resin may include 15 to 22 parts by weight of the acrylonitrile component with respect to the total weight of the acrylonitrile-butadiene-styrene (ABS) copolymer resin.

When a content of the acrylonitrile component in the acrylonitrile-butadiene-styrene (ABS) copolymer resin is excessively small, the compatibility between the acrylonitrile-butadiene-styrene (ABS) copolymer resin and the polyketone resin may be degraded.

As the acrylonitrile content in the acrylonitrile-butadiene-styrene (ABS) copolymer resin is increased, sizes of the polyketone domains distributed in the acrylonitrile-butadiene-styrene (ABS) copolymer resin may be reduced, resulting in an increase in the mechanical property of the polymer alloy.

Specifically, as the styrene-acrylonitrile copolymer resin contains an increased amount of the acrylonitrile component, the content of nitrile groups, which are polar groups, is increased, and thus compatibility with the polyketone, which is the polar polymer, may be increased, relative to the acrylonitrile-butadiene-styrene (ABS) copolymer. In other words, the higher content of the acrylonitrile component, the smaller polyketone domains formed in the composition, resulting in improvement in the mechanical property of the polymer alloy.

Meanwhile, when the content of the acrylonitrile component in the acrylonitrile-butadiene-styrene (ABS) copolymer resin is excessively high, the size of the polyketone domains to be mixed becomes smaller, and therefore it may be difficult to exhibit the characteristic of the polyketone. That is, it may be difficult to achieve an effect of enhancing surface hardness or chemical resistance.

Therefore, it is preferable to appropriately control the content of the acrylonitrile component in the acrylonitrile-butadiene-styrene (ABS) copolymer resin according to the performance of materials to be implemented.

The polymeric composition according to an aspect may further include a reinforcement to provide a molded product requiring a high modulus. As the reinforcement, a filter for reinforcing stiffness such as a glass fiber or mineral fiber may be used.

Specifically, the glass fiber is one of artificial fibers formed in a thin string by stretching glass, and may include at least one selected from the group consisting of silicon oxide ($SiO_2$), aluminum oxide ($Al_2O_3$), iron oxide ($Fe_2O_3$), calcium oxide (CaO), magnesium oxide (MgO), sodium oxide ($Na_2O$), boron oxide ($B_2O_3$) and titanium oxide ($TiO_2$). However, the type of the fiber is not limited to the above-mentioned examples, and the present invention may include modifications within a range that can be easily inferred by those of ordinary skill in the art.

The polymeric composition according to an aspect may further include an additive, and as an additive, at least one selected from the group consisting of a thermal stabilizer, a UV stabilizer, an anti-oxidant, a lubricant, a surface stabilizer, a flame retardant, a carbon black, a pigment, a wax and a deodorant may be used.

A thermal stabilizer, a UV stabilizer and an anti-oxidant are chemicals added to prevent or inhibit degradation of a polymeric composition. The polymeric composition according to an aspect includes a plastic component such as polycarbonate, and such a plastic component becomes degraded by heat, light or oxygen, which should be avoided. Therefore, the degradation of the polymeric composition according to an embodiment may be prevented or inhibited by adding a thermal stabilizer, a UV stabilizer and an anti-oxidant as needed.

A lubricant is an agent added to impart high flowability to a polymer composition in the hot molding, or to facilitate the draft of a molded product from a mold. The polymeric composition according to an aspect may include a softening agent or a plasticizer mainly serving to modify plasticity in processing as needed, and further includes a release agent for further facilitating drafting.

A surface stabilizer is an additive added to form a smooth surface when a molded product is manufactured using a polymeric composition, and the polymeric composition according to an example may include a surface stabilizer.

A flame retardant is an additive added to improve flame retardance of a polymeric composition, and may be applied to the surface of the molded product according to an example. Plastic may easily combust, and in combustion, a toxic gas may be generated, and therefore, to prevent this, a flame retardant may be added. The flame retardant may be a phosphorous-based flame retardant. Specifically, bisphenol-A diphenylphosphate and a mixture including the same may be used. However, flame retardants that can be used herein are not limited to the above-mentioned examples, and the present invention may include modifications within a range that can be easily inferred by those of ordinary skill in the art.

As above, the description on the polymeric composition further including a compatibilizer will be completed. The type and composition ratio of the polymeric composition are not limited to the above-mentioned examples, and the present invention may include modifications within a range that can be easily inferred by those of ordinary skill in the art.

Next, results of an experiment for measuring physical properties on examples and comparative examples of the present invention to help in understanding the present invention will be explained.

To perform the experiment for measuring physical properties, each of polymeric compositions including components at contents shown in [Table 1] to [Table 3] for respective examples and comparative examples was mixed with a Henschel mixer and uniformly dispersed. Subsequently, the dispersed polymeric composition was prepared in a pellet form by extrusion in a twin screw extruder (L/D=40 and Φ=25 mm) at a temperature, ranging from 220 to 250° C. Afterward, the prepared pellets were dried in an oven at 80° C. for 4 hours and subjected to injection molding, thereby obtaining a physical property specimen.

In [Example 1] to [Example 8] and [Comparative Example 1] to [Comparative Example 5], a polymeric composition including a polyketone resin, an acrylonitrile-butadiene-styrene (ABS) copolymer resin and a compatibilizer was mixed with 0.2 phr each of a phosphite anti-oxidant, a phenol-based anti-oxidant and a lubricant with respect to the resin, and extruded using a twin screw extruder to be prepared in a pellet form. Hereinafter, phr is defined as a part per hundred with respect to 100 parts by weight of the total polymeric composition.

As a compatibilizer, at least one of an amine-based compatibilizer and a maleic anhydride-modified copolymer compatibilizer (hereinafter, referred to as an MA compatibilizer) was used. More specifically, the polyketone resin used was 330A manufactured by Hyosung, and the acrylonitrile-butadiene-styrene (ABS) resin used was 780N manufactured by Kumho, the amine-based compatibilizer used was N-(2-aminoethyl)-3-aminopropyltrimethoxysilane manufactured by Shin-Etsu, and the MA compatibilizer used was MA-g-EVA manufactured by SCONA.

Afterward, the prepared pellets were dried in an oven at 80° C. for 4 hours, and subjected to injection by an injection molding machine with a family mold at a cylinder temperature of 220 to 235° C. and under a pressure of 30 kgf/cm$^2$, thereby preparing an evaluation specimen.

In [Example 9] to [Example 13] and [Comparative Example 6] to [Comparative Example 10], a polymeric composition including a polyketone resin, a styrene-acrylonitrile copolymer resin and a butadiene-g-ABS resin was mixed with 0.2 phr of each of a phosphite-based anti-oxidant, a phenol-based anti-oxidant, and a lubricant with respect to the resin, and extruded using a twin screw extruder to be prepared in a pellet form. In [Example 9] to [Example 13] and [Comparative Example 6] to [Comparative Example 10], to measure the change in physical property in acrylonitrile-butadiene-styrene (ABS) copolymer resin according to the acrylonitrile content, the styrene-acrylonitrile copolymer resin and the butadiene-g-ABS resin were added independently. The acrylonitrile-butadiene-styrene (ABS) copolymer resin may be prepared by synthesizing a styrene-acrylonitrile copolymer resin and a butadiene-g-ABS resin, and therefore, descriptions of the styrene-acrylonitrile copolymer resin and the butadiene-g-ABS resin will be understood to include description of the acrylonitrile-butadiene-styrene (ABS) copolymer resin having the same component ratio.

As a butadiene-g-ABS resin, a butadiene (60 wt %)-g-ABS resin containing 60 parts by weight of butadiene with respect to the butadiene-g-ABS resin was used.

Afterward, the prepared pellets were dried in an oven at 80° C. for 4 hours, and subjected to injection by an injection molding machine with a family mold at a cylinder temperature ranging from 220 to 235° C. and under a pressure of 30 kgf/cm$^2$, thereby preparing evaluation specimens.

In [Example 14] to [Example 20] and [Comparative Example 11] to [Comparative Example 17], a polymeric composition including a polyketone resin, a polycarbonate (PC) resin, an acrylonitrile-butadiene-styrene (ABS) resin, a reinforcement containing a mineral fiber and an amine-based compatibilizer was mixed with 0.2 phr each of a phosphite-based anti-oxidant, a phenol-based anti-oxidant and a lubricant with respect to the resin, and extruded using a twin screw extruder to be prepared in a pellet form.

The polycarbonate (PC) resin used was CF-1050 manufactured by Samsung SDI, and the mineral fiber used was NYGLOS® 4W manufactured by NYCO.

Hereinafter, the prepared pellets were dried in an oven at 80° C. for 4 hours, and subjected to injection by an injection molding machine with a family mold at a cylinder temperature ranging from 230 to 260° C. and under a pressure of 30 kgf/cm$^2$, thereby preparing evaluation specimens.

Composition ratios of the polymeric compositions used in [Example 1] to [Example 20] and [Comparative Example 1]

to [Comparative Example 17] are as follows, and specific details thereof are shown in [Table 1] to [Table 3].

Example 1

A specimen was prepared using a polymeric composition including 3 parts by weight of a polyketone resin, 96 parts by weight of an acrylonitrile-butadiene-styrene (ABS) resin, and 1 part by weight of an amine-based compatibilizer with respect to the total weight of the polymeric composition.

Example 2

A specimen was prepared using a polymeric composition including 10 parts by weight of a polyketone resin, 89 parts by weight of an acrylonitrile-butadiene-styrene (ABS) resin, and 1 part by weight of an amine-based compatibilizer with respect to the total weight of the polymeric composition.

Example 3

A specimen was prepared using a polymeric composition including 20 parts by weight of a polyketone resin, 79 parts by weight of an acrylonitrile-butadiene-styrene (ABS) resin, and 1 part by weight of an amine-based compatibilizer with respect to the total weight of the polymeric composition.

Example 4

A specimen was prepared using a polymeric composition including 10 parts by weight of a polyketone resin, 87 parts by weight of an acrylonitrile-butadiene-styrene (ABS) resin, and 3 parts by weight of an amine-based compatibilizer with respect to the total weight of the polymeric composition.

Example 5

A specimen was prepared using a polymeric composition including 9 parts by weight of a polyketone resin, 85 parts by weight of an acrylonitrile-butadiene-styrene (ABS) resin, 1 part by weight of an amine-based compatibilizer, and 5 parts by weight of an MA compatibilizer with respect to the total weight of the polymeric composition.

Example 6

A specimen was prepared using a polymeric composition including 10 parts by weight of a polyketone resin, 89 parts by weight of an acrylonitrile-butadiene-styrene (ABS) resin, and 1 part by weight of an MA compatibilizer with respect to the total weight of the polymeric composition.

Example 7

A specimen was prepared using a polymeric composition including 10 parts by weight of a polyketone resin, 87 parts by weight of an acrylonitrile-butadiene-styrene (ABS) resin, and 3 parts by weight of an MA compatibilizer with respect to the total weight of the polymeric composition.

Example 8

A specimen was prepared using a polymeric composition including 10 parts by weight of a polyketone resin, 86 parts by weight of an acrylonitrile-butadiene-styrene (ABS) resin, and 5 parts by weight of an MA compatibilizer with respect to the total weight of the polymeric composition.

Example 9

A specimen was prepared using a polymeric composition including 10 parts by weight of a polyketone resin, 60 parts by weight of a styrene-acrylonitrile copolymer resin having 27 to 29 parts by weight of an acrylonitrile content with respect to the styrene-acrylonitrile copolymer resin and 30 parts by weight of butadiene, with respect to the total weight of the polymeric composition.

Example 10

A specimen was prepared using a polymeric composition including 10 parts by weight of a polyketone resin, 60 parts by weight of a styrene-acrylonitrile copolymer resin having 24 to 26 parts by weight of an acrylonitrile content with respect to the styrene-acrylonitrile copolymer resin and 30 parts by weight of butadiene, with respect to the total weight of the polymeric composition.

Example 11

A specimen was prepared using a polymeric composition including 10 parts by weight of a polyketone resin, 60 parts by weight of a styrene-acrylonitrile copolymer resin having 30 to 32 parts by weight of an acrylonitrile content with respect to the styrene-acrylonitrile copolymer resin and 30 parts by weight of butadiene, with respect to the total weight of the polymeric composition.

Example 12

A specimen was prepared using a polymeric composition including 10 parts by weight of a polyketone resin, 62 parts by weight of a styrene-acrylonitrile copolymer resin having 24 to 26 parts by weight of an acrylonitrile content with respect to the styrene-acrylonitrile copolymer resin and 28 parts by weight of butadiene, with respect to the total weight of the polymeric composition.

Example 13

A specimen was prepared using a polymeric composition including 10 parts by weight of a polyketone resin, 55 parts by weight of a styrene-acrylonitrile copolymer resin having 27 to 29 parts by weight of an acrylonitrile content with respect to the styrene-acrylonitrile copolymer resin and 35 parts by weight of butadiene, with respect to the total weight of the polymeric composition.

Example 14

A specimen was prepared using a polymeric composition including 3 parts by weight of a polyketone resin, 76 parts by weight of a polycarbonate (PC) resin, 5 parts by weight of an acrylonitrile-butadiene-styrene (ABS) copolymer resin, 15 parts by weight of a reinforcement containing a mineral fiber and 1 part by weight of an amine-based compatibilizer, with respect to the total weight of the polymeric composition.

Example 15

A specimen was prepared using a polymeric composition including 10 parts by weight of a polyketone resin, 69 parts by weight of a polycarbonate (PC) resin, 5 parts by weight of an acrylonitrile-butadiene-styrene (ABS) copolymer resin, 15 parts by weight of a reinforcement containing a mineral fiber and 1 part by weight of an amine-based compatibilizer, with respect to the total weight of the polymeric composition.

Example 16

A specimen was prepared using a polymeric composition including 20 parts by weight of a polyketone resin, 59 parts by weight of a polycarbonate (PC) resin, 5 parts by weight of an acrylonitrile-butadiene-styrene (ABS) copolymer resin, 15 parts by weight of a reinforcement containing a mineral fiber and 1 part by weight of an amine-based compatibilizer, with respect to the total weight of the polymeric composition.

Example 17

A specimen was prepared using a polymeric composition including 10 parts by weight of a polyketone resin, 74 parts by weight of a polycarbonate (PC) resin, 5 parts by weight of an acrylonitrile-butadiene-styrene (ABS) copolymer resin, 15 parts by weight of a reinforcement containing a mineral fiber and 1 part by weight of an amine-based compatibilizer, with respect to the total weight of the polymeric composition.

Example 18

A specimen was prepared using a polymeric composition including 10 parts by weight of a polyketone resin, 64 parts by weight of a polycarbonate (PC) resin, 5 parts by weight of an acrylonitrile-butadiene-styrene (ABS) copolymer resin, 20 parts by weight of a reinforcement containing a mineral fiber and 1 part by weight of an amine-based compatibilizer, with respect to the total weight of the polymeric composition.

Example 19

A specimen was prepared using a polymeric composition including 10 parts by weight of a polyketone resin, 54 parts by weight of a polycarbonate (PC) resin, 20 parts by weight of an acrylonitrile-butadiene-styrene (ABS) copolymer resin, 15 parts by weight of a reinforcement containing a mineral fiber and 1 part by weight of an amine-based compatibilizer, with respect to the total weight of the polymeric composition.

Example 20

A specimen was prepared using a polymeric composition including 10 parts by weight of a polyketone resin, 44 parts by weight of a polycarbonate (PC) resin, 30 parts by weight of an acrylonitrile-butadiene-styrene (ABS) copolymer resin, 15 parts by weight of a reinforcement containing a mineral fiber and 1 part by weight of an amine-based compatibilizer, with respect to the total weight of the polymeric composition.

Comparative Example 1

A specimen was prepared using a polymeric composition including 25 parts by weight of a polyketone resin, 74 parts by weight of an acrylonitrile-butadiene-styrene (ABS) resin and 1 part by weight of an amine-based compatibilizer with respect to the total weight of the polymeric composition.

Comparative Example 2

A specimen was prepared using a polymeric composition including 100 parts by weight of an acrylonitrile-butadiene-styrene (ABS) resin with respect to the total weight of the polymeric composition.

Comparative Example 3

A specimen was prepared using a polymeric composition including 10 parts by weight of a polyketone resin and 90 parts by weight of an acrylonitrile-butadiene-styrene (ABS) resin with respect to the total weight of the polymeric composition.

Comparative Example 4

A specimen was prepared using a polymeric composition including 9 parts by weight of a polyketone resin, 85 parts by weight of an acrylonitrile-butadiene-styrene (ABS) resin and 6 parts by weight of an MA compatibilizer with respect to the total weight of the polymeric composition.

Comparative Example 5

A specimen was prepared using a polymeric composition including 10 parts by weight of a polyketone resin, 87 parts by weight of an acrylonitrile-butadiene-styrene (ABS) resin and 4 parts by weight of an amine-based compatibilizer with respect to the total weight of the polymeric composition.

Comparative Example 6

A specimen was prepared using a polymeric composition including 10 parts by weight of a polyketone resin, 60 parts by weight of a styrene-acrylonitrile copolymer resin having 18 to 20 parts by weight of an acrylonitrile content with respect to the styrene-acrylonitrile copolymer resin and 30 parts by weight of butadiene, with respect to the total weight of the polymeric composition.

Comparative Example 7

A specimen was prepared using a polymeric composition including 10 parts by weight of a polyketone resin, 50 parts by weight of a styrene-acrylonitrile copolymer resin having 24 to 26 parts by weight of an acrylonitrile content with respect to the styrene-acrylonitrile copolymer resin and 40 parts by weight of butadiene, with respect to the total weight of the polymeric composition.

Comparative Example 8

A specimen was prepared using a polymeric composition including 10 parts by weight of a polyketone resin, 80 parts by weight of a styrene-acrylonitrile copolymer resin having 24 to 26 parts by weight of an acrylonitrile content with respect to the styrene-acrylonitrile copolymer resin and 10 parts by weight of butadiene, with respect to the total weight of the polymeric composition.

Comparative Example 9

A specimen was prepared using a polymeric composition including 10 parts by weight of a polyketone resin, 70 parts by weight of a styrene-acrylonitrile copolymer resin having 24 to 26 parts by weight of an acrylonitrile content with respect to the styrene-acrylonitrile copolymer resin and 20 parts by weight of butadiene, with respect to the total weight of the polymeric composition.

Comparative Example 10

A specimen was prepared using a polymeric composition including 10 parts by weight of a polyketone resin, 62 parts by weight of a styrene-acrylonitrile copolymer resin having 24 to 26 parts by weight of an acrylonitrile content with respect to the styrene-acrylonitrile copolymer resin and 28 parts by weight of butadiene, with respect to the total weight of the polymeric composition.

Comparative Example 11

A specimen was prepared using a polymeric composition including 25 parts by weight of a polyketone resin, 54 parts by weight of a polycarbonate (PC) resin, 5 parts by weight of an acrylonitrile-butadiene-styrene (ABS) copolymer resin, 15 parts by weight of a reinforcement containing a mineral fiber and 1 part by weight of an amine-based compatibilizer, with respect to the total weight of the polymeric composition.

Comparative Example 12

A specimen was prepared using a polymeric composition including 10 parts by weight of a polyketone resin, 84 parts by weight of a polycarbonate (PC) resin, 5 parts by weight of an acrylonitrile-butadiene-styrene (ABS) copolymer resin and 1 part by weight of an amine-based compatibilizer, excluding a reinforcement containing a mineral fiber, with respect to the total weight of the polymeric composition.

Comparative Example 13

A specimen was prepared using a polymeric composition including 10 parts by weight of a polyketone resin, 54 parts by weight of a polycarbonate (PC) resin, 5 parts by weight of an acrylonitrile-butadiene-styrene (ABS) copolymer resin, 30 parts by weight of a reinforcement containing a mineral fiber and 1 part by weight of an amine-based compatibilizer, with respect to the total weight of the polymeric composition.

Comparative Example 14

A specimen was prepared using a polymeric composition including 10 parts by weight of a polyketone resin, 70 parts by weight of a polycarbonate (PC) resin, 5 parts by weight of an acrylonitrile-butadiene-styrene (ABS) copolymer resin and 15 parts by weight of a reinforcement containing a mineral fiber, excluding an amine-based compatibilizer, with respect to the total weight of the polymeric composition.

Comparative Example 15

A specimen was prepared using a polymeric composition including 10 parts by weight of a polyketone resin, 67 parts by weight of a polycarbonate (PC) resin, 5 parts by weight of an acrylonitrile-butadiene-styrene (ABS) copolymer resin, 15 parts by weight of a reinforcement containing a mineral fiber and 3 parts by weight of an amine-based compatibilizer, with respect to the total weight of the polymeric composition.

Comparative Example 16

A specimen was prepared using a polymeric composition including 79 parts by weight of a polycarbonate (PC) resin, 5 parts by weight of an acrylonitrile-butadiene-styrene (ABS) copolymer resin, 15 parts by weight of a reinforcement containing a mineral fiber and 1 part by weight of an amine-based compatibilizer, excluding a polyketone resin, with respect to the total weight of the polymeric composition.

Comparative Example 17

A specimen was prepared using a polymeric composition including 10 parts by weight of a polyketone resin, 37 parts by weight of a polycarbonate (PC) resin, 37 parts by weight of an acrylonitrile-butadiene-styrene (ABS) copolymer resin, 15 parts by weight of a reinforcement containing a mineral fiber and 1 part by weight of an amine-based compatibilizer, with respect to the total weight of the polymeric composition.

In [Table 1], the above-described composition ratios according to [Example 1] to [Example 8] and [Comparative Example 1] to [Comparative Example 5] are summarized.

TABLE 1

| | Resin | | Compatibilizer (wt %) | |
|---|---|---|---|---|
| | Polyketone resin (wt %) | ABS resin (wt %) | Amine-based compatibilizer | MA compatibilizer |
| Example 1 | 3 | 96 | 1 | 0 |
| Example 2 | 10 | 89 | 1 | 0 |
| Example 3 | 20 | 79 | 1 | 0 |
| Example 4 | 10 | 87 | 3 | 0 |
| Example 5 | 9 | 85 | 1 | 5 |
| Example 6 | 10 | 89 | 0 | 1 |
| Example 7 | 10 | 87 | 0 | 3 |
| Example 8 | 10 | 86 | 0 | 5 |
| Comparative Example 1 | 25 | 74 | 1 | 0 |
| Comparative Example 2 | 0 | 100 | 0 | 0 |
| Comparative Example 3 | 10 | 90 | 0 | 0 |
| Comparative Example 4 | 9 | 85 | 0 | 6 |
| Comparative Example 5 | 10 | 87 | 4 | 0 |

In [Table 2], the above-described composition ratios according to [Example 9] to [Example 13] and [Comparative Example 6] to [Comparative Example 10] are summarized.

TABLE 2

| | Polyketone resin | SAN resin | | | | Butadiene (60 wt %)-g-ABS resin |
|---|---|---|---|---|---|---|
| | | SAN1 | SAN2 | SAN3 | SAN4 | |
| Example 9 | 10 | 0 | 0 | 60 | 0 | 30 |
| Example 10 | 10 | 0 | 60 | 0 | 0 | 30 |
| Example 11 | 10 | 0 | 0 | 0 | 60 | 30 |
| Example 12 | 10 | 0 | 62 | 0 | 0 | 28 |
| Example 13 | 10 | 0 | 55 | 0 | 0 | 35 |

TABLE 2-continued

|  | Poly-ketone resin | SAN resin | | | | Butadiene (60 wt %)-g-ABS resin |
| --- | --- | --- | --- | --- | --- | --- |
|  |  | SAN1 | SAN2 | SAN3 | SAN4 |  |
| Comparative Example 6 | 10 | 60 | 0 | 0 | 0 | 30 |
| Comparative Example 7 | 10 | 0 | 50 | 0 | 0 | 40 |
| Comparative Example 8 | 10 | 0 | 80 | 0 | 0 | 10 |
| Comparative Example 9 | 10 | 0 | 70 | 0 | 0 | 20 |
| Comparative Example 10 | 10 | 0 | 62 | 0 | 0 | 28 |

In [Table 2], SAN1 to SAN4 distinguish styrene-acrylonitrile copolymer resins depending on the acrylonitrile content in a styrene-acrylonitrile copolymer resin. SAN1 refers to a styrene-acrylonitrile copolymer resin in which approximately 18 to 20 parts by weight of the acrylonitrile is contained with respect to the total weight of the styrene-acrylonitrile copolymer resin, SAN2 refers to a styrene-acrylonitrile copolymer resin in which approximately 24 to 26 parts by weight of the acrylonitrile is contained with respect to the total weight of the styrene-acrylonitrile copolymer resin, SAN3 refers to a styrene-acrylonitrile copolymer resin in which approximately 27 to 29 parts by weight of the acrylonitrile is contained with respect to the total weight of the styrene-acrylonitrile copolymer resin, and SAN4 refers to a styrene-acrylonitrile copolymer resin in which approximately 30 to 32 parts by weight of the acrylonitrile is contained with respect to the total weight of the styrene-acrylonitrile copolymer resin.

In [Table 3], the above-described composition ratios according to [Example 14] to [Example 20] and [Comparative Example 11] to [Comparative Example 17] are summarized.

TABLE 3

|  | Polyketone resin (wt %) | Polycarbonate resin (wt %) | ABS resin (wt %) | Reinforcement (wt %) | Amine-based compatibilizer (wt %) |
| --- | --- | --- | --- | --- | --- |
| Example 14 | 3 | 76 | 5 | 15 | 1 |
| Example 15 | 10 | 69 | 5 | 15 | 1 |
| Example 16 | 20 | 59 | 5 | 15 | 1 |
| Example 17 | 10 | 74 | 5 | 10 | 1 |
| Example 18 | 10 | 64 | 5 | 20 | 1 |
| Example 19 | 10 | 54 | 20 | 15 | 1 |
| Example 20 | 10 | 44 | 30 | 15 | 1 |
| Comparative Example 11 | 25 | 54 | 5 | 15 | 1 |
| Comparative Example 12 | 10 | 84 | 5 | 0 | 1 |
| Comparative Example 13 | 10 | 54 | 5 | 30 | 1 |
| Comparative Example 14 | 10 | 70 | 5 | 15 | 0 |
| Comparative Example 15 | 10 | 67 | 5 | 15 | 3 |
| Comparative Example 16 | 0 | 79 | 5 | 15 | 1 |
| Comparative Example 17 | 10 | 37 | 37 | 15 | 1 |

Other physical properties of the specimens prepared using the polymeric compositions according to [Example 1] to [Example 20] and [Comparative Example 1] to [Comparative Example 17] were evaluated by the following methods.

Melt Index (MI)

The melt index of each of the specimens prepared using the polymeric compositions of [Example 14] to [Example 20] and [Comparative Example 11] to [Comparative Example 17] was measured according to American Society for Testing and Materials (ASTM) D1238 under conditions of 2.16 kg and 260° C.

Tensile Strength

The tensile strength of each of the specimens prepared using the polymeric compositions of [Example 14] to [Example 20] and [Comparative Example 11] to [Comparative Example 17] was measured according to ASTM D638 under conditions of Type 1 specifications and a test speed of 3 mm/min. An average value of the results obtained by repeating the test for a total of 5 times was used.

Izod Notched Impact Strength

The Izod notched impact strength of each of the specimens prepared using the polymeric compositions of [Example 1] to [Example 20] and [Comparative Example 1] to [Comparative Example 17] was measured according to ASTM D265 under conditions of dimensions of 63.5×12.7×3.2 mm and room temperature. An average value of the results obtained by repeating the test for a total of 5 times was used.

Flexural Strength and Flexural Modulus

The flexural strength and flexural modulus of each of the specimens prepared using the polymeric compositions of [Example 1] to [Example 20] and [Comparative Example 1] to [Comparative Example 17] were measured according to ASTM D790 on under conditions of a specimen thickness of 6.4 mm and a speed of 2.8 mm/min. An average value of the results obtained by repeating the test for a total of 5 times was used.

Pencil Hardness

A Pencil hardness was measured using a pencil hardness tester. Specifically, a pencil lead was exposed at 3 mm in a cylindrical shape and abraded to have a sharp angle and a flat tip. Subsequently, the pencil lead was placed at an angle of 45° to a coating surface, and the tester was set parallelly to the same level as the specimen and then moved toward the specimen at a constant speed of approximately 10 mm, thereby measuring whether the specimens prepared using the polymeric compositions of [Example 1] to [Example 8], [Example 14] to [Example 20], [Comparative Example 1] to [Comparative Example 5] and [Comparative Example 11] to [Comparative Example 17] were scratched. The test was repeated 5 times with different positions of the specimens and the pencil lead, and in cases of scratching occurring once or more out of total five tests, the hardness of the pencil lead was measured.

Appearance Characteristic

A possible problem such as a short shot, phase separation, silver streak or surface protrusion, which may occur on each of the molded products prepared using the polymeric compositions of [Example 1] to [Example 8], [Example 14] to [Example 20], [Comparative Example 1] to [Comparative Example 5] and [Comparative Example 11] to [Comparative Example 17], was visually examined.

Dimensions

Dimensions of molded products produced by standard injection using the polymeric compositions of [Example 1] to [Example 8], [Example 14] to [Example 20], [Comparative Example 1] to [Comparative Example 5] and [Comparative Example 11] to [Comparative Example 17] were first measured at 23° C., and after more than 24 hours, dimensions of the molded products were measured at 23° C. for the second time, and thus a dimensional change was identified. When the change in the first dimensions with respect to the second dimensions was in a range of −0.4 to 0.2 mm, it was represented as Pass, and when the change was beyond the range, it was represented as No Good (NG).

The physical properties measured by the methods described above are shown in [Table 4] to [Table 6] below. More specifically, the physical properties of the specimens prepared using the polymeric compositions of [Example 1] to [Example 8] and [Comparative Example 1] to [Comparative Example 5] are shown in [Table 4], the physical properties of the specimens prepared using the polymeric compositions of [Example 9] to [Example 13] and [Comparative Example 6] to [Comparative Example 10] are shown in [Table 5], and the physical properties of the specimens prepared using the polymeric compositions of [Example 14] to [Example 20] and [Comparative Example 11] to [Comparative Example 17] are shown in [Table 6].

TABLE 4

|  | Flexural strength (kgf/cm$^2$) | Flexural modulus (kgf/cm$^2$) | Impact strength (kgf·cm/cm) | Pencil hardness | Chemical resistance | Injectable appearance | Dimensions |
|---|---|---|---|---|---|---|---|
| Example 1 | 630 | 20585 | 24.3 | 2B | Pass | Pass | Pass |
| Example 2 | 652 | 21097 | 28.6 | 2B | Pass | Pass | Pass |
| Example 3 | 651 | 21422 | 21.6 | B | Pass | Pass | Pass |
| Example 4 | 602 | 20873 | 35 | 2B | Pass | Pass | Pass |
| Example 5 | 601 | 19820 | 38 | 3B | Pass | Pass | Pass |
| Example 6 | 600 | 20800 | 20 | 2B | Pass | Pass | Pass |
| Example 7 | 580 | 19540 | 22 | 2B | Pass | Pass | Pass |
| Example 8 | 560 | 18959 | 34 | 2B | Pass | Pass | Pass |
| Comparative Example 1 | 561 | 18422 | 15.4 | B | Pass | NG | NG |
| Comparative Example 2 | 650 | 20812 | 25 | 3B | NG | Pass | Pass |
| Comparative Example 3 | 560 | 18466 | 14 | 3B | NG | NG | NG |
| Comparative Example 4 | 450 | 18010 | 35 | 3B | Pass | Pass | Pass |
| Comparative Example 5 | 600 | 20210 | 31 | 2B | Pass | Pass | Pass |

TABLE 5

|  | Flexural strength (kgf/cm$^2$) | Flexural modulus (kgf/cm$^2$) | Impact strength (kgf·cm/cm) |
|---|---|---|---|
| Example 9 | 618 | 20249 | 39 |
| Example 10 | 582 | 19362 | 26 |
| Example 11 | 675 | 22206 | 42 |
| Example 12 | 655 | 20400 | 20 |
| Example 13 | 600 | 20002 | 35 |
| Comparative Example 6 | 485 | 18340 | 15 |
| Comparative Example 7 | 506 | 16573 | 42 |
| Comparative Example 8 | 627 | 27615 | 1.8 |
| Comparative Example 9 | 691 | 23377 | 8 |
| Comparative Example 10 | 675 | 22434 | 15 |

TABLE 6

|  | Melt index | Flexural strength (kgf/cm$^2$) | Flexural modulus (kgf/cm$^2$) | Impact strength (kgf·cm/cm) | Tensile strength | Elongation | Pencil hardness | Injectability | Dimensions |
|---|---|---|---|---|---|---|---|---|---|
| Example 14 | 27 | 768 | 46583 | 4.5 | 613 | 5.3 | 2B | Pass | Pass |

TABLE 6-continued

| | Melt index | Flexural strength (kgf/cm²) | Flexural modulus (kgf/cm²) | Impact strength (kgf·cm/cm) | Tensile strength | Elongation | Pencil hardness | Injectability | Dimensions |
|---|---|---|---|---|---|---|---|---|---|
| Example 15 | 28 | 852 | 45933 | 4.4 | 606 | 7.8 | B | Pass | Pass |
| Example 16 | 30 | 847 | 43830 | 4.0 | 604 | 8 | B | Pass | Pass |
| Example 17 | 28 | 848 | 32194 | 5 | 616 | 10.1 | 2B | Pass | Pass |
| Example 18 | 22 | 768 | 43830 | 4.5 | 613 | 5.3 | 2B | Pass | Pass |
| Example 19 | 31 | 810 | 41900 | 4.0 | 605 | 9.9 | B | Pass | Pass |
| Example 20 | 33 | 763 | 38702 | 3.8 | 600 | 13 | 2B | Pass | Pass |
| Comparative Example 11 | 33 | 828 | 45356 | 3.5 | 591 | 7.6 | B | NG | NG |
| Comparative Example 12 | 30 | 808 | 22515 | 6.9 | 608 | 25.5 | B | NG | Pass |
| Comparative Example 13 | 17 | 798 | 47980 | 1.8 | 619 | 5.3 | 2B | NG | Pass |
| Comparative Example 14 | 22 | 893 | 40430 | 2 | 637 | 5.7 | 3B | NG | NG |
| Comparative Example 15 | 20 | 767 | 30573 | 5.2 | 553 | 15.5 | 2B | Pass | Pass |
| Comparative Example 16 | 26 | 850 | 40202 | 3.7 | 600 | 8.2 | 3B | NG | Pass |
| Comparative Example 17 | 35 | 656 | 29840 | 3.5 | 580 | 30 | 3B | NG | Pass |

The following conclusions were deduced from Examples 1 to 8 and Comparative Examples 1 to 5 of [Table 1] and [Table 4].

First, compared to Examples 1 to 8 and Comparative Example 2, it was confirmed that, among the alloys of the polyketone resin and the acrylonitrile-butadiene-styrene (ABS) copolymer resin, Examples 1 to 8 containing polyketone found improvement in pencil hardness and chemical resistance, relative to Comparative Example 2 without polyketone.

Subsequently, compared to Examples 1 to 3 and Comparative Example 1, it was confirmed that, when the polyketone content in the polymeric composition was 20 parts by weight or less, there were less changes in the flexural strength, flexural modulus and impact strength. However, it was confirmed that, when the polyketone content in the polymeric composition was 25 parts by weight, the flexural strength, flexural modulus and impact strength were decreased at 561 kgf/cm², 18442 kgf/cm², and 15.4 kgf·cm/cm, respectively, phase separation occurred during injection, and a great change in dimensional occurred. That is, to apply an eco-friendly polyketone resin, which is a carbon monoxide (CO) recycling material, without degradation of the physical properties of the molded product, it was confirmed that the polyketone resin is preferably contained at 3 to 20 parts by weight in the polymeric composition, with respect to the total weight of the composition.

Afterward, it was confirmed that, based on Examples 2, 4 to 8 and Comparative Examples 3 to 5, physical properties of the specimens were changed with the addition of a compatibilizer.

Compared with the results of Examples 2, 4 to 8 and Comparative Examples 3 to 5, it was confirmed that Comparative Example 3 that does not include a compatibilizer had low flexural strength, tensile modulus and impact strength, but when 1 phr or more of an amine-based compatibilizer or MA compatibilizer was added, Comparative Example 3 had a flexural strength of 600 or more, a tensile modulus of 20,000 or more, and an impact strength of 20 or more. Meanwhile, as shown in Comparative Example 5, when an amine-based compatibilizer was added at 4 phr or more to the polymeric composition, compared to when 3 phr of an amine-based compatibilizer was added, the physical properties were maintained without a significant increase. That is, it was confirmed that, in terms of the use of a material, an amine-based compatibilizer was added in a suitable ratio.

In addition, compared to the results of Examples 6 to 8 and Comparative Example 3 and 4, it was confirmed that, when an MA compatibilizer was added, the impact strengths of the specimens were increased, relative to Comparative Example 3 that does not include a compatibilizer. Moreover, it was confirmed that, in Examples 6 to 8 and Comparative Example 4, the content of an MA compatibilizer was increased to 1, 3, 5 and 6 parts by weight, respectively, and therefore the flexural strength and the flexural modulus were gradually decreased, but the impact strength was increased to 20, 22, 34 and 35 kgf·cm/cm, respectively. However, in Comparative Example 4, when 6 parts by weight of the MA compatibilizer was contained with respect to the total weight of the composition, it was confirmed that the impact strength was relatively high at 35 kgf·cm/cm, but the flexural strength and the flexural modulus were drastically reduced to 450 kgf/cm² and 18010 kgf/cm², respectively.

Moreover, in Example 5, when an amine-based compatibilizer was simultaneously used with an MA compatibilizer, it was confirmed that the impact strength of the specimen was greatly increased to 38 kgf cm/cm.

The following conclusions were deduced from Examples 9 to 13 and Comparative Examples 6 to 10 of [Table 2] and [Table 5].

Comparing the results of Examples 9 to 11 and Comparative Example 6, as the acrylonitrile content in the styrene-acrylonitrile copolymer resin was increased, the flexural strength was increased to 485, 582, 618 and 675 kgf/cm$^2$, the flexural modulus was increased to 18,340, 19,362, 20,249 and 22,206 kgf/cm$^2$, and the impact strength was increased to 15, 26, 39 and 42 kgf-cm/cm. Particularly, it was confirmed that Example 11 which has the highest acrylonitrile content in the styrene-acrylonitrile copolymer resin exhibited an impact strength approximately 3 times that of Comparative Example 6 having the smallest acrylonitrile content.

In addition, comparing the results of Examples 10, 12, 13 and Comparative Example 7, it was confirmed that the content of the butadiene (60 wt %)-g-ABS resin was increased to 28, 30, 35 and 40 parts by weight with respect to the total weight of the polymeric composition, the flexural strength was reduced to 655, 582, 600 and 506 kgf/cm$^2$, and the flexural modulus was reduced to 20,400, 19,362, 20,002 and 16,573 kgf/cm$^2$, but the impact strength was increased to 20, 26, 35 and 42 kgf cm/cm. It is because, as the content of a rubber content butadiene was increased, the impact resistance was increased, but the stiffness and strength were decreased.

Since required physical properties of an applied part differ, a polymeric composition having an appropriate mixing ratio may be applied. According to an example, to ensure the physical property of an exterior material for an electronic apparatus, the acrylonitrile component may be contained at 15 to 22 parts by weight with respect to the total weight of the acrylonitrile-butadiene-styrene (ABS) copolymer resin. In addition, the butadiene (60 wt %)-g-ABS resin may be contained at 28 to 38 parts by weight with respect to the total weight of the polymeric composition, and in other words, the butadiene component may be contained at 16 to 23 parts by weight with respect to the total weight of the polymeric composition.

The following conclusions were deduced from Examples 14 to 20 and Comparative Examples 11 to 17 of [Table 3] and [Table 6].

First, based on Examples 14 to 16 and Comparative Examples 11 and 16, changes in physical properties of the specimen according to the content of the polyketone resin were confirmed.

Specifically, it was confirmed that, in Examples 14 to 16, as the polyketone content was increased to 3, 10 and 20 parts by weight with respect to the total weight of the polymeric composition, the melt index (MI) was increased to 27, 28 and 30.

In Examples 14 to 16 and Comparative Example 16, compared to Comparative Example 16 in which the polyketone resin content was 0, the pencil strength of Examples 14 to 16 in which the polyketone resin was contained at 3 to 20 parts by weight was increased to 2B or B. In addition, in Comparative Example 16 in which the polyketone content was 0, it was confirmed that the phase separation phenomenon may occur during injection.

In Examples 14 to 16 and Comparative Example 11, when the polyketone resin content was 25 as in Comparative Example 11, compared to Examples 14 to 16, it was confirmed that the phase separation phenomenon occurred on the appearance during injection, and the dimensional stability was decreased.

Therefore, it was confirmed that the polyketone resin was preferably contained at 3 to 20 parts by weight with respect to the total weight of the polymeric composition.

In addition, based on Examples 15, 17 to 18 and Comparative Examples 12 and 13, it was confirmed that the physical properties of the specimen were changed depending on the content of a reinforcement.

Specifically, in Comparative Example 12 in which the reinforcement content was 0, compared to Examples 15, 17 and 18, it was confirmed that the flexural modulus was nearly doubled.

In addition, in Comparative Example 13 in which 30 parts by weight of the reinforcement was contained with respect to the total weight of the polymeric composition, compared to Examples 15, 17 and 18, it was confirmed that the impact strength was greatly decreased, and the glossiness of an injected surface may be inhibited due to the protrusion of a reinforcement on its surface in injection.

Further, based on Examples 15, 19 and 20 and Comparative Example 17, the change in physical properties of the specimen depending on the resin content in the polymeric composition was confirmed. More specifically, the content of the polyketone resin was fixed at 10 parts by weight with respect to the total weight of the polymeric composition, and a ratio of the acrylonitrile-butadiene-styrene (ABS) copolymer resin and the polycarbonate (PC) resin was changed during the experiments.

In Examples 15, 19 and 20, and Comparative Example 17, it was confirmed that, as the content of the acrylonitrile-butadiene-styrene (ABS) copolymer resin was increased, compared to the polycarbonate (PC) resin, the flexural modulus was sequentially reduced to 45,933, 41,900, 38,702 and 29,840 kgf/cm$^2$, and the elongation was increased to 7.8, 9.9, 13 and 30, respectively.

Meanwhile, as described in Example 20, until 44 parts by weight of the polycarbonate (PC) resin and 30 parts by weight of the acrylonitrile-butadiene-styrene (ABS) copolymer resin were included with respect to the total weight of the polymeric composition (ABS/PC=0.7), there was little change in physical properties, but when 37 parts by weight of the polycarbonate (PC) resin and 37 parts by weight of the acrylonitrile-butadiene-styrene (ABS) copolymer resin were included (ABS/PC=1), it was confirmed that the flexural modulus was drastically decreased, the elongation was drastically increased, and the glossiness of the injection product was reduced, resulting in the decrease in pencil hardness.

Therefore, it was confirmed that the acrylonitrile-butadiene-styrene (ABS) copolymer resin may be contained at 1 part by weight or more and less than 100 parts by weight with respect to the total weight of the polycarbonate (PC) resin.

As described above, the results of measuring the physical properties of examples and comparative examples of eco-friendly polymeric compositions including an eco-friendly polyketone resin prepared with carbon monoxide (CO) as a raw material were explained.

Hereinafter, a molded product consisting of a polymeric composition according to an example will be described.

The molded product according to an example may consist of a polymeric composition including a polyketone resin prepared with carbon monoxide (CO) as a raw material and an acrylonitrile-butadiene-styrene (ABS) copolymer resin with respect to the total weight of the polymeric composition. The polymeric composition according to an example may further include a polycarbonate (PC) resin or a flame retardant, and when excellent impact resistance is required, the polymeric composition may further include a reinforcement. Hereinafter, descriptions overlapping with the above description relating to the polymeric composition will be omitted.

The molded product may be formed in a film, sheet, pellet or fiber form, and as an example of the molded product, an electronic apparatus will be explained.

The molded product may include interior or exterior materials of an electronic apparatus, and more specifically, includes a housing of an electronic apparatus. The housing is a box-shaped region surrounding all mechanical devices including a case accommodating parts or a frame embracing an apparatus, and may be a concept including accessories of the housing. In the specification, the accessories may be defined as a concept containing a part of the housing such as a TV bezel or stand, or parts of the electronic apparatus.

The electronic apparatus may include at least one selected from the group consisting of a display device, a smart device, a computer, a tablet PC, a printer, a multifunction printer, a refrigerator, a washing machine, an air conditioner, a robot cleaner, a camera, an e-book, an e-paper, 3D glasses and a battery charger. Hereinafter, applications of the molded product according to the present invention disclosed using a display device as an example of the electronic apparatus will be explained.

Figure 2:
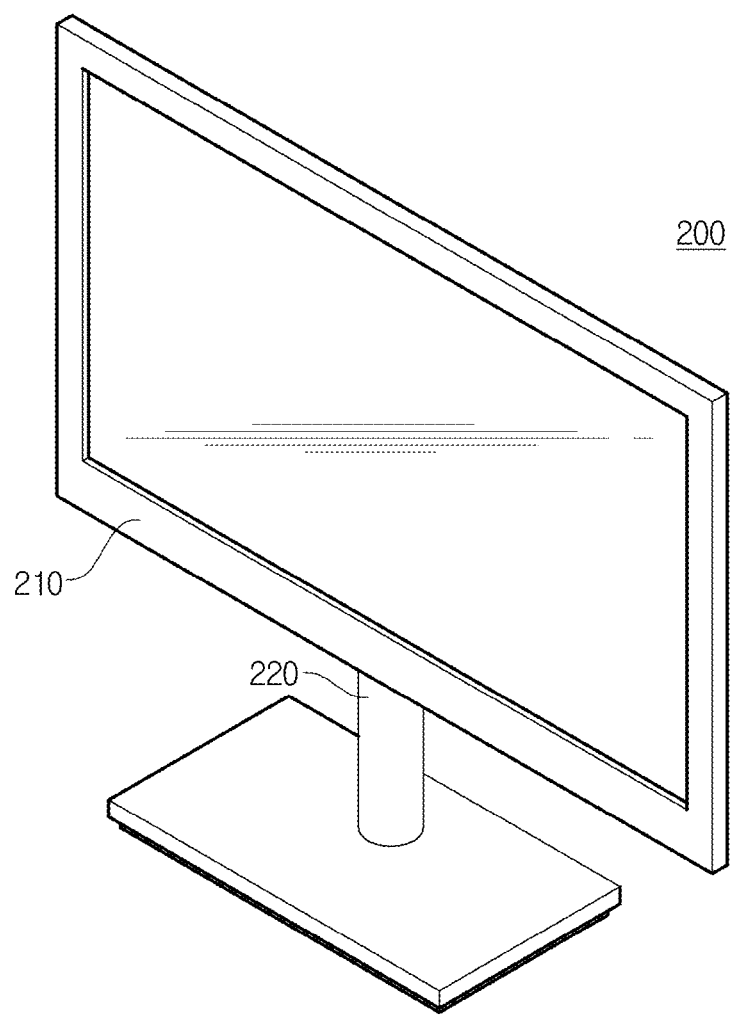
FIG. 2 is a perspective view of a display device according to an exemplary embodiment.

FIG. 2 is a perspective view of a display device 200 according to an exemplary embodiment.

Referring to FIG. 2, the display device 200 according to an exemplary embodiment may include a main body 210 that displays images and outputs sound, and a stand 220 that supports the main body 210.

The main body 210 and the stand 220 of the display device according to an exemplary embodiment may include those formed with the above-described composition as a material. That is, they may be molded products manufactured by injection-molding of the above-described polymeric composition. That is, as an eco-friendly material such as polyketone is applied to an interior or exterior material of an electronic apparatus, the implementation of such an eco-friendly material may be in compliance with the global eco-friendly policies, and may meet consumers' needs for an eco-friendly product. In addition, it is apparent that the stiffness of the stand 220 can be ensured by adding a reinforcement to a polymer composition applied to the stand 220 of the display device 200 according to an exemplary embodiment.

As above, an electronic apparatus consisting of the polymeric composition according to an exemplary embodiment was explained.

Subsequently, a method for preparing the polymeric composition according to an exemplary embodiment and a method for manufacturing a molded product will be explained. The methods will be explained using the above-described electronic apparatus as an example of the molded product.

First, the structure of an extruder for producing the polymeric composition according to an exemplary embodiment and the structure of an injection molding machine for manufacturing a molded product produced by the extruder as a raw material will be explained.

Figure 3:
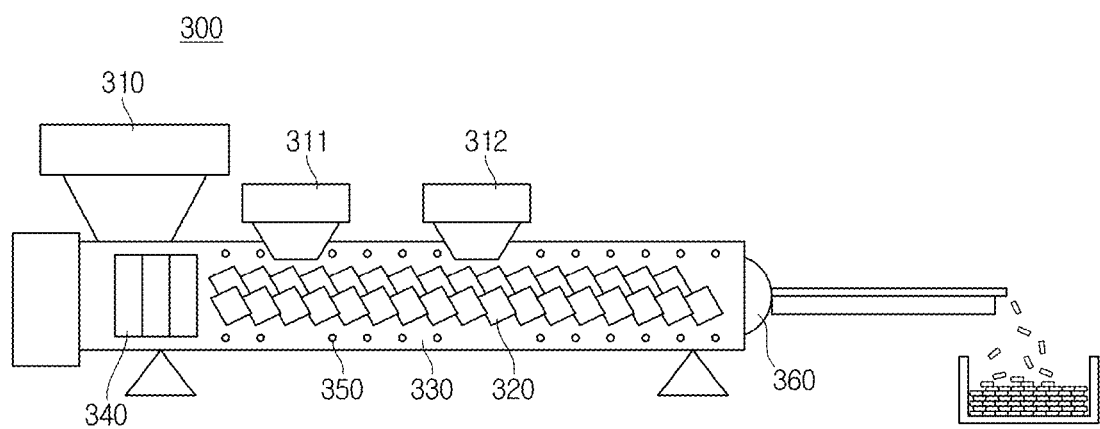
FIG. 3 is a diagram illustrating the structure of an extruder according to an exemplary embodiment.
Figure 4:
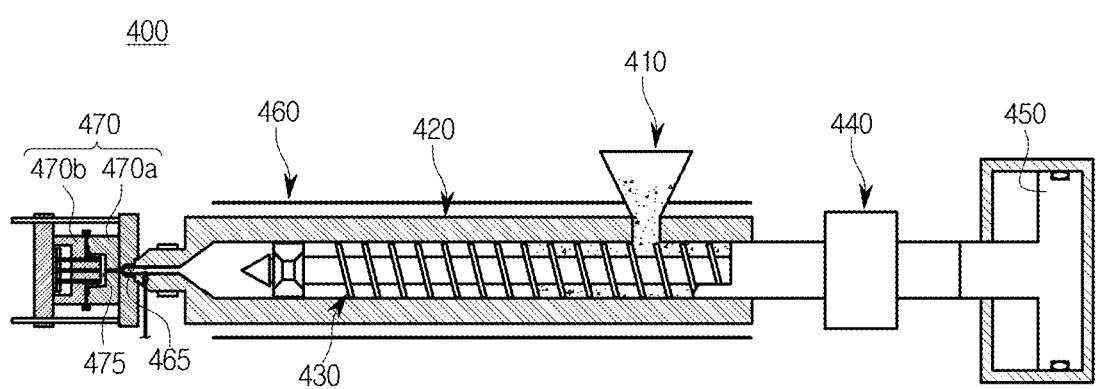
FIG. 4 is a diagram illustrating the structure of an injection molding machine according to an exemplary embodiment.

FIG. 3 shows the structure of an extruder according to an exemplary embodiment, and FIG. 4 shows the structure of an injection molding machine according to an exemplary embodiment.

Referring to FIG. 3, the extruder 300 according to an exemplary embodiment may include an extruder hopper 310 for adding a raw material, a first side feeder 311 and a second side feeder 312 for additional adding of the raw material, a shaft 320 that is rotatably equipped, an extruder cylinder 330 for accommodating the shaft 320, an extruder driving unit 340 for rotating the shaft 320, an extruder heater 350 for heating the inner side of the extruder cylinder 330, a discharging die 360 that outputs a polymeric composition, and an extruder control unit (not shown) for controlling a heating temperature of the extruder heater 350. The extruder 300 may be a continuous flow twin screw extruder as shown in FIG. 3, but the present invention is not limited thereto, and therefore, it may be a continuous flow single screw extruder.

The extruder driving unit 340 may include a motor for rotating the shaft 320, a coupling unit that is connected to a motor and deliver power of the motor to a gear unit, and a gear unit that rotates the shaft 320 by receiving the power of the motor. The shaft 320 driven by the extruder driving unit 340 may be rotated in a predetermined direction (e.g., a clock-wise direction) to apply a shear stress to a melted mixture, and may be rotated in a speed ranging from 100 to 400 rpm.

A plurality of the extruder heaters 350 may be present from a feed region to a discharge region so as to control an internal temperature of the extruder cylinder 330. That is, the extruder cylinder 330 may be divided into a plurality of sections, the inner temperature of the extruder cylinder 330 may be controlled by sections, and the temperature of each section may be adjusted according to a raw material that is processed.

Referring to FIG. 4, the injection molding machine 400 according to an exemplary embodiment may include an injection molding machine hopper 410 from which a raw material is added, a barrel 420 accommodating the raw material added through the injection molding machine hopper 410, a screw 430 equipped to move back and forth and rotatably inside the barrel 420, an injection molding machine motor 440 that delivers a torque to the screw 430, an injection molding machine cylinder unit 450 that is connected to the screw 430 and linearly moves the screw 430, an injection molding machine heater 460 that is equipped on a circumferential surface of the barrel 420 to heat the raw material accommodated in the barrel 420, a nozzle 465 that supplies the raw material of the synthetic resin accommodated in the barrel 420 to a mold 470, and a mold 470 that receives the raw material from the nozzle 465 to form a molded product.

The mold 470 may include a first mold 470a that receives the raw material and a second mold 470b that forms an injection cavity 475 formed therein by being combined with the first mold 470a. The first mold 470a may be a fixed mold, and the second mold 470b may be a movable mold.

As above, the extruder 300 and the injection molding machine 400 for manufacturing a molded product according to an exemplary embodiment were explained. Subsequently, a method for preparing the polymeric composition and a method for manufacturing a molded product according to an exemplary embodiment will be explained.

Figure 5:
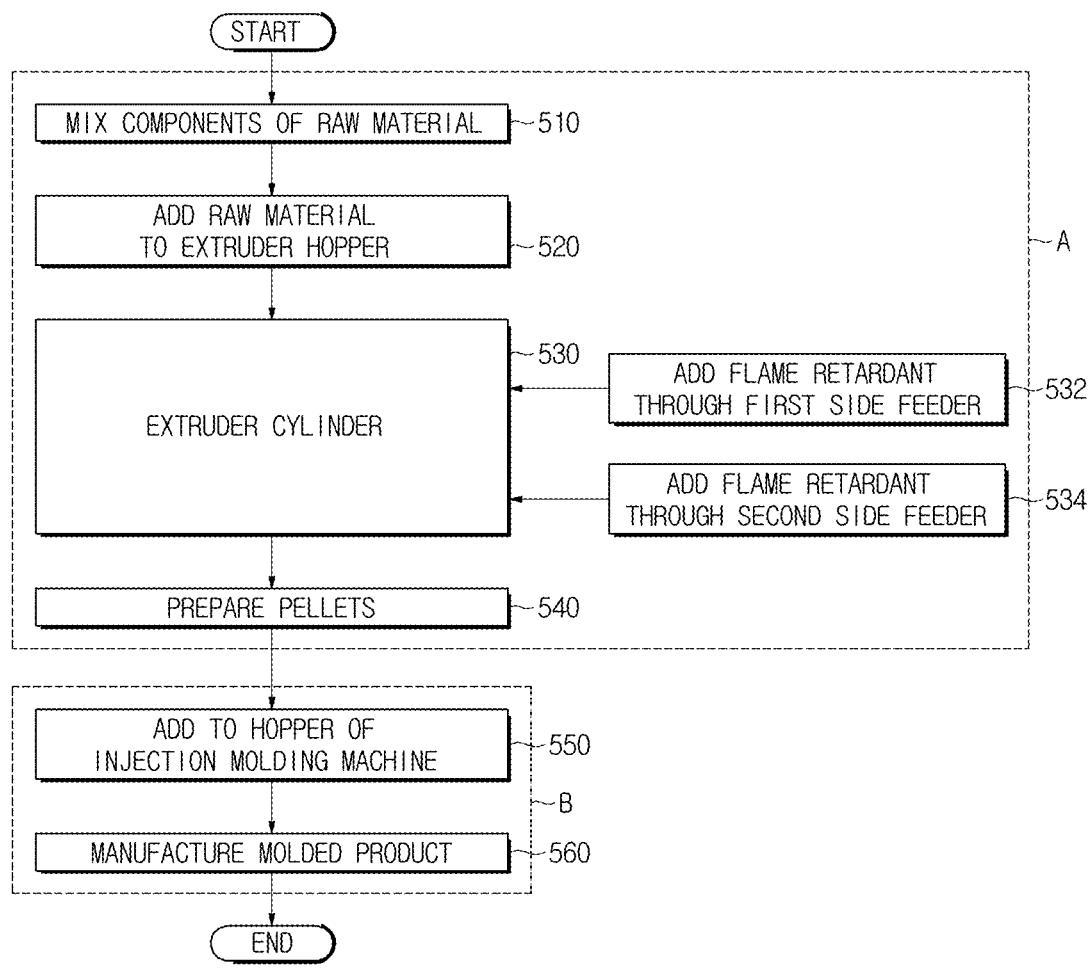
FIG. 5 is a diagram illustrating a method for preparing the polymeric composition and a method for manufacturing a molded product according to an exemplary embodiment.

FIG. 5 illustrates the method for preparing the polymeric composition and the method for manufacturing a molded product according to an exemplary embodiment. FIG. 5A illustrates a process of preparing pellets in the extruder 300, and FIG. 5B illustrates a process of manufacturing a molded product in the injection molding machine 400.

Referring to FIG. 5, first, a raw material is pre-mixed using a Henschel mixer, and the pre-mixed raw material is added to the extruder hopper 310. The raw material added to the extruder hopper 310 was extruded in the extruder cylinder 330. Here, a flame retardant may be separately added to the extruder cylinder 330 through the first side feeder 311, and a reinforcement may be separately added to the extruder cylinder 330 through the second side feeder 312.

When the flame retardant and the reinforcement are added together with the raw material, the time in which the flame retardant and the reinforcement remain in the extruder 300 becomes longer, and thus the material may be decomposed. As a result, the flame retardant or the reinforcement may not be properly functioned.

For this reason, in the method for preparing the polymeric composition according to an exemplary embodiment, by adding a flame retardant and a reinforcement through the first side feeder 311 and the second side feeder 312, the amounts of the flame retardant and the reinforcement added may be uniformly controlled, and the grinding of the flame retardant and the reinforcement due to a force received from the inside of the extruder 300 may be prevented.

According to the polymeric composition according to an exemplary embodiment, a polymeric composition which includes 3 to 20 parts by weight of a polyketone resin prepared with carbon monoxide (CO) as a raw material and 80 to 97 parts by weight of an acrylonitrile-butadiene-styrene (ABS) copolymer resin with respect to the total weight of the polymeric composition may be provided as a raw material. Meanwhile, the type of the raw material is not limited thereto, and the polymeric composition may be further included in a polycarbonate (PC) resin. In addition, as a flame retardant, bisphenol-A diphenylphosphate and a mixture including the same may be used, and as a reinforcement, a mineral filler may be used. Hereinafter, concerning the type of the polymeric composition that can be added as a raw material, the descriptions overlapped with the above-described polymeric composition will be omitted.

[Table 7] below shows conditions for producing the polymeric composition according to an exemplary embodiment.

TABLE 7

| Section | Temperature (° C.) | Position |
|---|---|---|
| First section | 250 | Extruder hopper 310 |
| Second section | 235 | |
| Third section | 230 | First side feeder 311 |
| Forth section | 225 | |
| Fifth section | 225 | |
| Sixth section | 230 | Second side feeder 312 |
| Seventh section | 240 | Discharging die 360 |

Referring to [Table 7], to produce the polymeric composition according to an exemplary embodiment, the extruder cylinder 330 was divided into a plurality of sections, and the temperature was controlled by sections. Specifically, the extruder cylinder 330 was divided into 7 sections, and the temperature was adjusted gradually by sections. Hereinafter, the peripheral region of the extruder hopper 310 of the extruder cylinder 330 was defined as a first section, and the peripheral region of the discharging die 360 of the extruder cylinder 330 was defined as a seventh section. In the preparation example of the present invention, the temperature of the first section was adjusted to 250° C., and the temperature of the seventh section was adjusted to 275° C. In addition, the temperature of the extruder cylinder 330 was gradually decreased in the direction from the first section to the seventh section, and then increased.

The polymeric composition may be added to the first section through the extruder hopper 310 and discharged from the seventh section through the discharging die 360, and the polymeric composition discharged from the seventh section through the discharging die 360 was dried, thereby preparing a pellet.

Afterward, a molded product may be manufactured by melting the prepared pellet added to the hopper 410 of the injection molding machine 400, and injection-molding the melted polymeric composition using the mold 470. Here, the molded product is defined as a concept including the housing of an electronic apparatus, and a description overlapping with the above description is omitted.

More specifically, the step of injection-molding the polymeric composition may include adding the polymeric composition to the hopper 410 of the injection molding machine, melting the added polymeric composition, and providing the melted polymeric composition to a mold 470.

[Table 8] shows conditions for injection molding performed when an injection molding process using the polymeric compositions according to Examples 1 to 13 described above, and [Table 9] shows conditions for injection molding performed when an injection molding process using the polymeric compositions according to Examples 14 to 20 described above.

TABLE 8

| Area | Temperature (° C.) | Location |
|---|---|---|
| First section | 235 | Hopper 410 |
| Second section | 230 | |
| Third section | 225 | |
| Forth section | 220 | Nozzle 465 |
| First mold | 55 | Fixed mold 470a |
| Second mold | 65 | Movable mold 470b |

TABLE 9

| Area | Temperature (° C.) | Location |
|---|---|---|
| First section | 230 | Hopper 410 |
| Second section | 240 | |
| Third section | 250 | |
| Forth section | 260 | Nozzle 465 |
| First mold | 55 | Fixed mold 470a |
| Second mold | 62 | Movable mold 470b |

As shown in [Table 8] and [Table 9], in the preparation example of the present invention, the barrel 420 was divided into a plurality of sections, and the temperature was adjusted gradually. More particularly, in the case of [Table 8], the temperature of the barrel 420 around the nozzle 465 was adjusted to 220° C., and the temperature of the barrel 420 around the injection molding machine hopper was adjusted to 235° C. so as to supply the raw material to the mold. In addition, the temperature of the first mold, which is the fixed mold, was adjusted to 55° C., and the temperature of the second mold, which is the movable mold, was adjusted to 60° C.

Meanwhile, in the case of [Table 9], the temperature of the barrel 420 around the nozzle 465 was adjusted to 260° C., and the temperature of the barrel 420 around the injection molding machine hopper 410 was adjusted to 235° C. so as to supply the raw material to the mold 470. In addition, the temperature of the first mold 470a, which is the fixed mold, was adjusted to 60° C., and the temperature of the second mold 470b, which is the movable mold, was adjusted to 60° C.

As above, various examples of a polymeric composition, the method for preparing the polymeric composition, an electronic apparatus and a method for manufacturing the electronic apparatus were explained. It should be broadly understood that the technical idea of the present invention is not limited to the above-described embodiments, and the exemplary embodiments disclosed herein can be easily modified within a range that can be easily considered by those of ordinary skill in the art.

The invention claimed is:

1. A polymeric composition, comprising:
 a polyketone resin prepared with carbon monoxide (CO) as a raw material;
 a thermoplastic resin containing an acrylonitrile-butadiene-styrene (ABS) resin; and
 an amine-based compatibilizer, wherein
 the amine-based compatibilizer has one amine group at the end.

2. The polymeric composition of claim 1, wherein the polymeric resin contains:
 3 to 20 parts by weight of the polyketone resin with respect to the total weight of the polymeric composition; and
 80 to 97 parts by weight of the thermoplastic resin with respect to the total weight of the polymeric composition.

3. The polymeric composition of claim 2, wherein the acrylonitrile-butadiene-styrene (ABS) copolymer resin comprises 15 to 22 parts by weight of the acrylonitrile component with respect to the total weight of the acrylonitrile-butadiene-styrene (ABS) copolymer resin.

4. The polymeric composition of claim 2, wherein the thermoplastic resin further comprises a polycarbonate (PC) resin, and 1 part by weight or more and less than 100 parts by weight of the acrylonitrile-butadiene-styrene (ABS) copolymer resin with respect to the total weight of the polycarbonate (PC) resin.

5. A polymeric composition, comprising:
 3 to 20 parts by weight of a polyketone resin prepared with carbon monoxide (CO) as a raw material;
 80 to 97 parts by weight of a thermoplastic resin containing an acrylonitrile-butadiene-styrene (ABS) copolymer resin with respect to the total weight of the polymeric composition;
 at least one of 10 to 20 parts by weight of a reinforcement with respect to the total weight of the polymeric composition; 1 to 3 parts by weight of an amine-based compatibilizer with respect to the total weight of the polymeric composition; and
 a phosphorous-based flame retardant.

6. A polymeric composition, comprising:
 3 to 20 parts by weight of a polyketone resin prepared with carbon monoxide (CO) as a raw material; and
 80 to 97 parts by weight of a thermoplastic resin containing a polycarbonate (PC) with respect to the total weight of the polymeric composition.

7. The polymeric composition of claim 6, wherein the thermoplastic resin further comprises an acrylonitrile-butadiene-styrene (ABS) copolymer resin, which comprises 15 to 22 parts by weight of the acrylonitrile component with respect to the total weight of the acrylonitrile-butadiene-styrene (ABS) copolymer resin.

8. The polymeric composition of claim 6, wherein the thermoplastic resin comprises 1 part by weight or more and less than 100 parts by weight of an acrylonitrile-butadiene-styrene (ABS) copolymer resin with respect to the total weight of the polycarbonate (PC) resin.

9. The polymeric composition of claim 6, further comprising:
 at least one of 10 to 20 parts by weight of a reinforcement with respect to the total weight of the polymeric composition;
 1 to 3 parts by weight of an amine-based compatibilizer with respect to the total weight of the polymeric composition; and
 a phosphorous-based flame retardant.

10. A method for preparing a polymeric composition, comprising:
 mixing a polymeric composition comprising 3 to 20 parts by weight of a polyketone resin prepared with carbon monoxide (CO) as a raw material, 80 to 97 parts by weight of an acrylonitrile-butadiene-styrene (ABS) copolymer resin and 1 to 3 parts by weight of an amine-based compatibilizer with respect to the total weight of the polymeric composition; and
 adding the polymeric composition to a hopper of an extruder, wherein
 the amine-based compatibilizer has one amine group at the end.

11. A method for preparing a polymeric composition, comprising:
 mixing a polymeric composition comprising 3 to 20 parts by weight of a polyketone resin prepared with carbon monoxide (CO) as a raw material and 80 to 97 parts by weight of an acrylonitrile-butadiene-styrene (ABS) copolymer resin with respect to the total weight of the polymeric composition;
 adding the polymeric composition to a hopper of an extruder;
 adding a flame retardant to a first side feeder; and
 adding a reinforcement to a second side feeder.

12. A method for manufacturing an electronic apparatus, comprising:
 preparing a polymeric composition comprising 3 to 20 parts by weight of a polyketone resin prepared with carbon monoxide (CO) as a raw material, 80 to 97 parts by weight of an acrylonitrile-butadiene-styrene (ABS) copolymer resin and 1 to 3 parts by weight of an amine-based compatibilizer with respect to the total weight of the polymeric composition; and
 performing injection molding by adding the polymeric composition to an injection molding machine, wherein
 the amine-based compatibilizer has one amine group at the end.

13. The polymeric composition of claim 2, further comprising:
 10 to 20 parts by weight of a reinforcement with respect to the total weight of the polymeric composition.

14. The polymeric composition of claim 2, further comprising:
 a phosphorous-based flame retardant.

* * * * *